United States Patent [19]
Zompolas

[11] 4,364,268
[45] Dec. 21, 1982

[54] REDUNDANT VACUUM SYSTEM FOR AIRCRAFT INSTRUMENTS

[75] Inventor: Thomas Zompolas, Milwaukee, Wis.

[73] Assignee: PAMCO Industries Corp., Milwaukee, Wis.

[21] Appl. No.: 260,290

[22] Filed: May 4, 1981

Related U.S. Application Data

[63] Continuation-in-part of Ser. No. 202,940, Nov. 3, 1980, abandoned.

[51] Int. Cl.³ ............................................. G01C 21/00
[52] U.S. Cl. ...................................... 73/178 R; 417/3
[58] Field of Search ................. 73/178 R, 384; 417/3, 417/374, 426

[56] References Cited

U.S. PATENT DOCUMENTS

| | | | |
|---|---|---|---|
| 2,348,113 | 5/1944 | Davis | 417/3 |
| 3,558,239 | 1/1971 | Schiber | 417/3 |
| 3,921,748 | 11/1975 | Dunn | 417/3 |
| 3,923,423 | 12/1975 | Lauck | 417/3 |

*Primary Examiner*—Donald O. Woodiel

[57] ABSTRACT

A redundant system for use in an aircraft instrument system of the type including a first pump adapted to be driven by an aircraft engine. At least one instrument is operably connected to the first pump. The redundant system includes a second pump selectively operably connected to the electrical power source of the aircraft and to the instrument. A switch is adapted to be connected to an air line connecting the instrument and the first pump, the switch being operable to provide an electrical connection between the second pump and the electrical power source in response to a change in pressure in the air line connecting the instrument and the first pump.

24 Claims, 4 Drawing Figures

REDUNDANT VACUUM SYSTEM FOR AIRCRAFT INSTRUMENTS

This application is a continuation-in-part of application Ser. No. 202,940, filed Nov. 3, 1980, now abandoned.

FIELD OF THE INVENTION

The present invention relates to instrument systems for aircraft and more particularly to vacuum and pressure operated instrument systems and to redundant vacuum and pressure sources for such systems.

BACKGROUND OF THE INVENTION

The instrument systems in many single engine aircraft commonly include a number of instruments such as a heading indicator, an attitude indicator, and a turn and bank indicator, each being vacuum operated. In those systems, the aircraft engine drives a vacuum pump, and the instruments described are connected by vacuum lines to the vacuum pump. While such a system is usually provided with a vacuum gauge to indicate to the pilot any failure in the vacuum system, wherein the pilot can then revert to visual flight, in some instances, such as when visibility is poor, failure of the vacuum system can be critical. In other single engine aircraft these same instrument systems are dependent on an air pressure source rather than a vacuum source. Here the aircraft engine drives an air compressor pump and air lines connect the air compressor pump to the instruments. These systems include an air pressure gauge to indicate to the pilot any failure in the instrument system, but once again if visibility is poor, failure of the system can be critical. While redundant or back-up systems have been employed in other applications such as in steering systems or fuel feed systems, no simplified or effective redundant systems of the type of the invention have been employed in the prior art.

Examples of the prior art back-up system for steering or fuel supply applications are illustrated in the Lauck U.S. Pat. No. 3,923,423; the Dunn U.S. Pat. No. 3,921,748; the Schiber U.S. Pat. No. 3,558,239; and the Davis U.S. Pat. No. 2,348,113.

SUMMARY OF THE INVENTION

The present invention provides an improved instrument system for aircraft wherein means are included for providing an automatic secondary vacuum or air pressure source for the instruments in the event of engine failure or failure of the primary vacuum or air pressure pump. The secondary source is actuated automatically by failure of the primary system and is connected to the instruments in such a manner as to cause the primary source to be sealed off from the instruments and air lines once the secondary system is operational. The secondary system is connected directly to the electrical power source of the aircraft such that it will be operable even if there is an engine failure. The system also provides a secondary attitude indicator which is operably connected to both the primary vacuum or air pressure source and the secondary source for operation in the event of failure of the primary attitude indicator.

More particularly, the invention comprises an instrument system for an aircraft including an engine and an electrical power source, the instrument system including a first pump adapted to be operably connected to the aircraft engine so as to be driven by the aircraft engine, at least one instrument, and means for operably connecting the instrument to the first pump. The instrument system also includes a second pump and means for operably connecting the second pump to the electrical power source of the aircraft. This means includes a switch which is connected to the means for operably connecting the instrument to the first pump, the switch being operable to provide an electrical connection between the second pump and the electrical power source in response to a change in air pressure in the means for connecting the instrument to the first pump. The instrument system also includes a means for operably connecting the second pump to the instrument.

The invention also includes a redundant vacuum system for use in a vacuum operated instrument system of the type including a first vacuum pump adapted to be operably connected to an aircraft engine so as to be driven by the aircraft engine, at least one vacuum operated instrument and means for operably connecting the vaccum operated instrument and the first vacuum pump. The redundant vacuum system includes a second vacuum pump and means for operably connecting the second vacuum pump to the electrical power source of the aircraft. This means includes a vacuum responsive switch adapted to be connected to the means for connecting the vacuum operated instrument to the first vacuum pump, the vacuum responsive switch being operable to provide an electrical connection between the second vacuum pump and the electrical power source in response to a decrease in vacuum in the means connecting the vacuum operated instrument and the first vacuum pump. The redundant vacuum system also includes means for operably connecting the second vacuum pump to the instrument.

One of the features of the invention is the further provision in the means for connecting the second pump to the electrical source of a manual switch having contacts intended to be closed after the first vacuum pump is actuated.

Another of the features of the invention is the provision in the means for connecting the second vacuum pump to the instrument of means for preventing connection of the second vacuum pump to the instrument when the first vacuum pump is operative.

Another of the features of the invention is the provision of a check valve between the first vacuum source and the instrument and for preventing airflow from the first vacuum pump to the instrument and a vacuum line between the check valve and the instrument and wherein the second vacuum pump is connected to the vacuum line between the check valve and the instrument.

In one embodiment of the invention, the instrument comprises an attitude indicator and the invention further includes a second attitude indicator, means for operably connecting the second attitude indicator to the first vacuum pump, and means for selectively connecting the second attitude indicator to the second vacuum pump.

The invention also includes a redundant air pressure means for use in an air pressure operated aircraft instrument system of the type including a first air compressor pump adapted to be operably connected to an aircraft engine so as to be driven by the aircraft engine, at least one air pressure operated instrument and means for operably connecting the air pressure operated instrument and the first air compressor pump. The redundant air pressure system includes a second air compressor pump and means for operably connecting the second air compressor pump to the electrical power source of the aircraft. This means includes an air pressure responsive switch adapted to be connected to the means for connecting the air pressure operated instrument to the first air compressor pump, the air pressure responsive switch being operable to provide an electrical connection between the second air compressor pump and the electrical power source in response to a decrease in air pressure in the means connecting the air pressure operated instrument and the first air compressor pump. The redundant air pressure system also includes means for operably connecting the second air compressor pump to the instrument.

One of the features of the invention is the further provision in the means for connecting the second pump to the electrical source of a manual switch having contacts intended to be closed after the first air compressor pump is actuated.

Another of the features of the invention is the provision in the means for connecting the second air compressor pump to the instrument of means for preventing connection of the second air compressor pump to the instrument when the first air compressor pump is operative.

Another of the features of the invention is the provision of a check valve between the first air pressure source and the instrument for preventing airflow from the instrument to the first air compressor pump, and an air pressure line between the check valve and the instrument and wherein the second air compressor pump is connected to the air pressure line between the check valve and the instrument.

In one embodiment of the invention, the instrument comprises an attitude indicator and the invention further includes a second attitude indicator and means for operably connecting the second attitude indicator to the first air compressor pump and means for selectively connecting the second attitude indicator to the second air compressor pump.

Various other features and advantage of the invention will become apparent by reference to the following description, claims and drawings.

Figure 1:
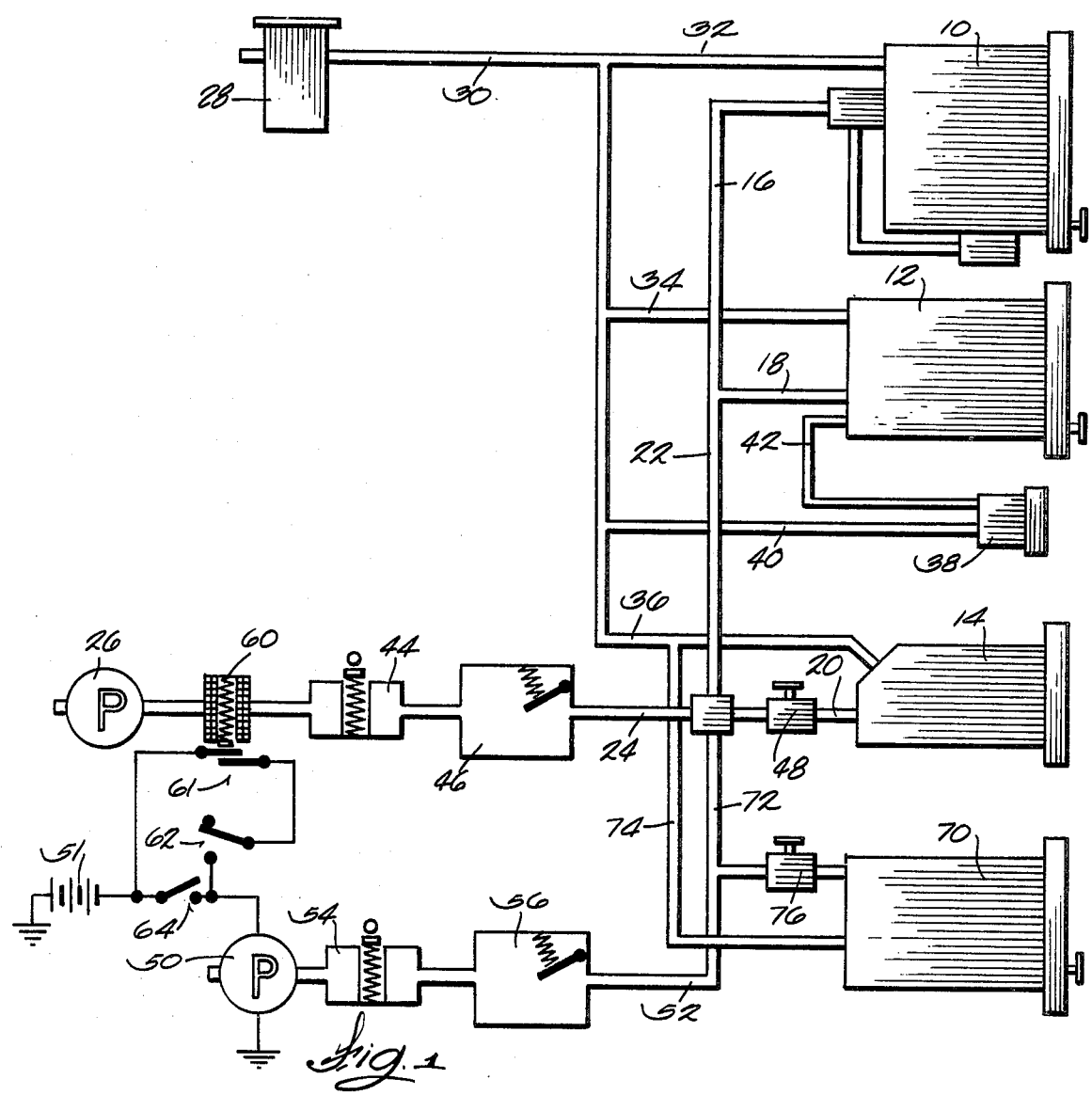
FIG. 1 is a schematic view of a vacuum operated instrument system embodying the present invention.

Before explaining at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 are a plurality of vacuum operated instruments of the type commonly employed in aircraft, these instruments including a heading indicator 10, an attitude indicator 12, and a turn and bank indicator 14. Those instruments are conventional and their operation will not be described in detail. These instruments are connected by means of vacuum lines or conduits 16, 18 and 20, respectively, to a vacuum line 22. The vacuum line 22 is, in turn, connected by a vacuum line 24 to a vacuum pump 26. The vacuum pump 26 is conventional and is adapted to be driven by the aircraft engine. The vacuum pump 26 generates a vacuum of at least 5 inches of mercury and causes an airflow through the vacuum line 22 and 24 of at least 5 cubic feet of air per minute. The heading indicator 10, the attitude indicator 12 and the turn and bank indicator 14 are also connected by an air line 30 and conduits 32, 34 and 36, respectively to an air filter 28, the air filter 28 being vented to the atmosphere.

Also included is a suction gauge 38 connected to the air line 30 by a conduit 40 and to the attitude indicator 12 by an air line 42.

The primary vacuum system described above also includes a conventional suction relief valve 44 connected to vacuum line 24 and functional to prevent a vacuum in that line in excess of 5 inches of mercury. If the vacuum pump 26 draws a vacuum in excess of this limit, the suction relief valve 44 will bleed air into the vacuum line 24. Also included is a gate check valve 46 adapted to prevent air flow from the pump 26 into the vacuum line 22. The gate check valve 46 is intended to prevent any damage to the instruments 10, 12 and 14 which might be caused by a sudden air reversal which could be caused, in turn, by an engine backfire. The use of the vacuum relief valve 44 and the gate check valve 46 is conventional and their constructions will not be described in detail.

The vacuum system also includes a restrictor valve 48 in the air line 20 for limiting the vacuum at the turn and bank indicator 14 to 2 inches of mercury.

Means are also included for providing a redundant or secondary vacuum source for maintaining a vacuum in the vacuum line 22 despite the failure of the vacuum pump 26 or failure of one of the elements 44 or 46 or failure of the aircraft engine. In the illustrated construction, the secondary vacuum source comprises a vacuum pump 50 driven by an electric motor connected to the airplane battery 51. The vacuum pump 50 is connected to the vacuum line 22 by a vacuum line 52. The vacuum pump 50 has a construction like that of the vacuum pump 26 and is also adapted to generate at least a vacuum of 5 inches of mercury in the vacuum line 52. Also included in the vacuum line 52 is a suction relief valve 54 having the same construction as relief valve 44 and intended to prevent the vacuum in the vacuum line 52 from being greater than 5 inches of mercury.

The secondary vacuum system also includes a gate check valve 56 having a construction like that of check valve 46 and intended to prevent air flow from the vacuum line 52 toward the vacuum line 22. In operation, when the vacuum pump 26 is operating, the vacuum in the line 22 will cause the gate valve 56 to close thereby preventing air flow through the line 52.

Means are also provided for causing electrical connection of the vacuum pump 50 with the airplane battery 51 in the event of a drop in the vacuum in the vacuum line 24 due to failure of the vacuum pump 26 or failure of the airplane engine. This means for causing electrical connection includes a vacuum responsive switch 60 connected to the vacuum line 24. The vacuum operated switch 60 includes normally open switch contacts 61 and means for sensing a decrease in the vacuum in the vacuum line 24. The vacuum operated switch 60 also includes means for closing the switch contacts 61 in response to an undue decrease in the vacuum in vacuum line 24. The circuit also includes a manually armed switch 62 intended to be closed by the pilot once the engine is started and the pump 26 begins to operate. This switch 62 is intended to be left open when the engine is not running since the vacuum responsive switch 60 causes the circuit to be closed thereby actuating secondary pump 50 whenever the pump 26 is not driven. The circuit can also include a manual override switch 64 in parallel with switches 60 and 62, the manual override switch 64 being functional to actuate the secondary pump 50 at the election of the pilot.

Figure 2:
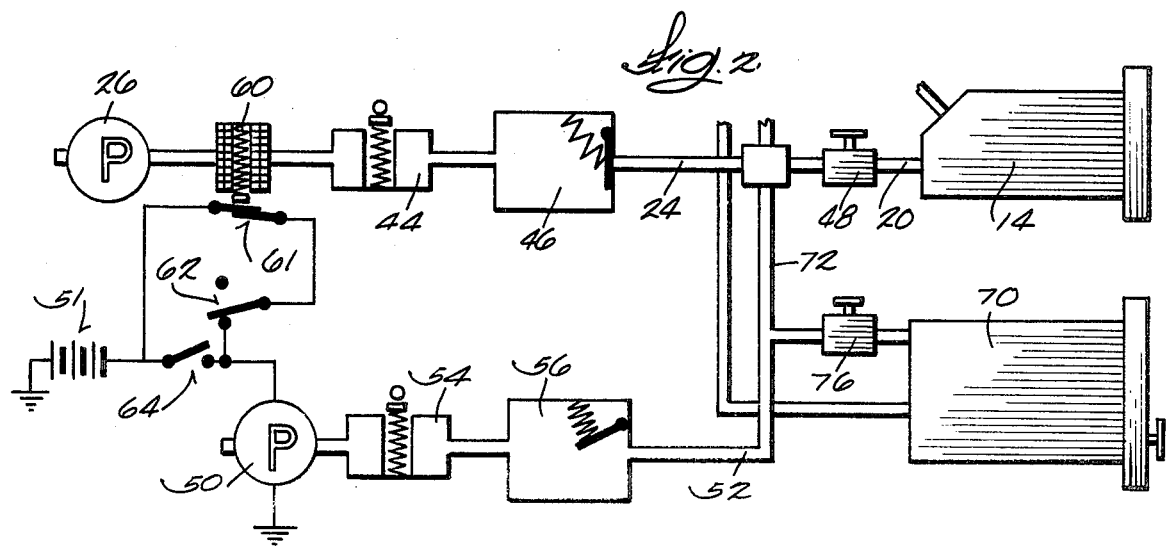
FIG. 2 is a partial schematic view of the system illustrated in FIG. 1 and showing the redundant vacuum pump operably connected to the vacuum operated instruments.

In operation of the system described above, during normal operation, the primary vacuum pump 26 is intended to draw a vacuum in the vacuum lines 24 and 22. The gate valve 56 prevents air flow through the vacuum line 24 and into the vacuum line 22. Once the engine driven vacuum pump 26 is actuated and the switch contacts 61 of the vacuum responsive switch 60 are opened, the pilot then moves the manual switch 62 to the position shown in FIG. 2 thereby closing the contacts of that switch. In the event that the pump 26 fails, or some other occurrence causes the vacuum in the vacuum line 24 to decrease, the contacts 61 of the vacuum responsive switch 60 will close and the secondary electrically driven vacuum pump 50 will be driven by the aircraft battery. The vacuum pump 50 will then cause an air flow through the vacuum line 52 thereby opening the gate valve 56 and also causing the gate valve 46 to close as shown in FIG. 2. In the event the vacuum responsive switch 60 fails to operate, the pilot can manually actuate the redundant vacuum pump 50 by closing the manually operable switch 64.

The illustrated construction also includes a redundant or secondary attitude indicator 70 connected to the vacuum line 22 by a vaccum line 72 and to the air line 30 by a conduit 74. The manual valve 76 is provided in the line 72 and is functional to permit the pilot to selectively connect the attitude indicator to the vacuum line 72. In the event of failure of the attitude indicator 12, opening of the manual control valve 76 will activate the redundant attitude indicator 70.

Figure 3:
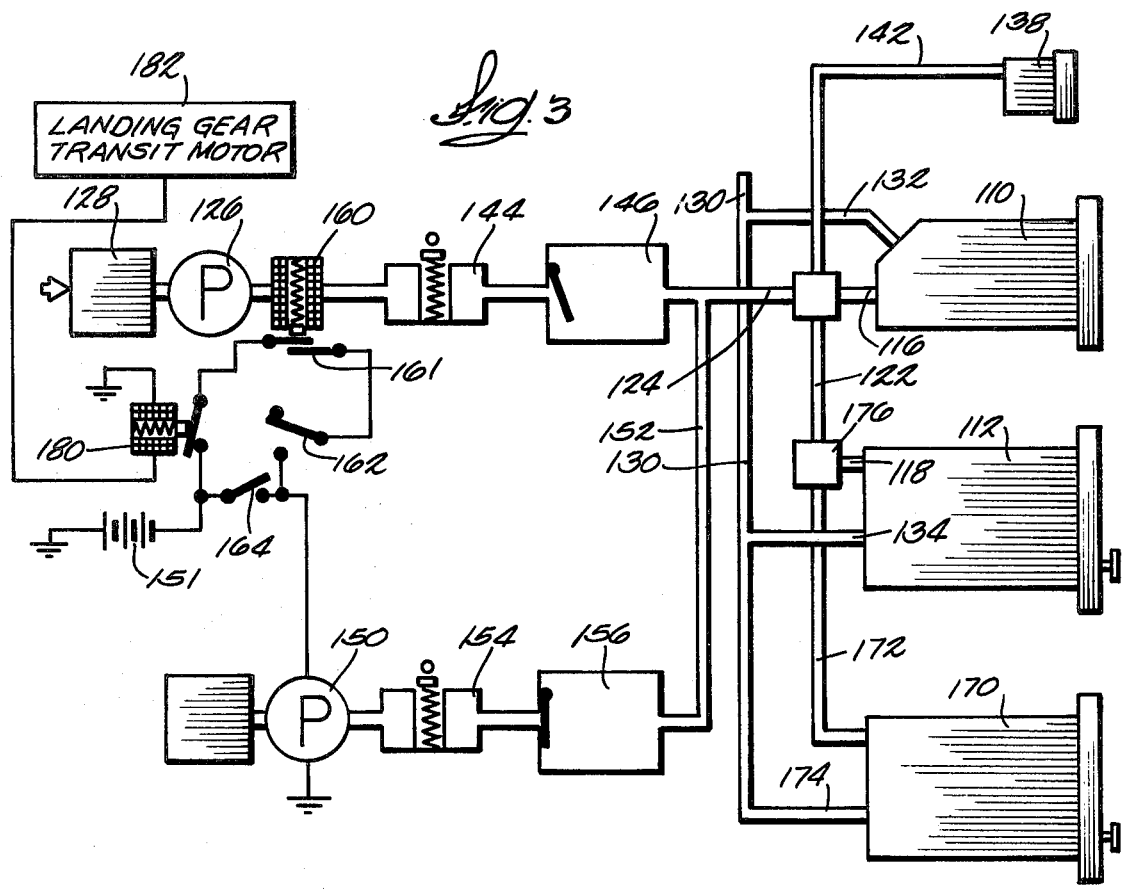
FIG. 3 is a schematic view similar to FIG. 1 and comprising a schematic view of an air pressure operated instrument system embodying the present invention.

Illustrated in FIG. 3 is an alternative embodiment of the invention illustrated in FIGS. 1 and 2, the alternative embodiment including a plurality of air pressure operated instruments of the type commonly employed in aircraft, these instruments including a heading indicator 110 and an attitude indicator 112. These instruments are conventional and their operation will not be described in detail. These instruments are connected by means of air pressure lines or conduits 116 and 118 respectively, to an air pressure line 122. The air pressure line 122 is, in turn, connected by an air pressure line 124 to an air compressor pump 126. The air compressor pump 126 is conventional and is adapted to be driven by the aircraft engine. The air compressor pump 126, connected to an air filter 128, generates an air pressure of at least 5 inches of mercury and causes an airflow through the air pressure line 124 and 122 of at least 5 cubic feet of air per minute. The heading indicator 110, and the attitude indicator 112 are also connected by an air line 130 and conduits 132 and 134 to the atmosphere.

Also included is a pressure gauge 138 connected to the air line 124 by a conduit 142.

The primary air pressure system described above also includes a conventional air pressure relief valve 144 connected to air pressure line 124 and functional to prevent air pressure in that line in excess of 5 inches of mercury. If the air compressor pump 126 pumps an air pressure in excess of this limit, the air pressure relief valve 144 will bleed air out of the air pressure line 124. Also included is a gate check valve 146 adapted to prevent airflow from air pressure line 124 into the pump 126. The gate check valve 146 is intended to prevent any damage to the instruments 110 and 112 which might be caused by a sudden air reversal which could be caused, in turn, by an engine backfire. The use of the air pressure relief valve 144 and the gate check valve 146 is conventional and their constructions will not be described in detail.

Means are also included for providing a redundant or secondary air pressure source for maintaining air pressure in the air pressure line 122 despite the failure of the air compressor pump 126 or failure of one of the elements 144 or 146 or failure of the aircraft engine. In the illustrated construction, the secondary air pressure source comprises an air pressure pump 150 driven by an electric motor connected to the airplane battery 151. The air compressor pump 150 is connected to the air pressure line 122 by an air pressure line 152. The air compressor pump 150 has a construction like that of the air compressor pump 126 and is also adapted to generate an air pressure of at least 5 inches of mercury in the air pressure line 152. Also included in the air pressure line 152 is an air pressure relief valve 154 having the same construction as relief valve 144 and intended to prevent the air pressure in the air pressure line 152 from being greater than 5 inches of mercury.

The secondary air pressure system also includes a gate check valve 156 having a construction like that of check valve 146 and intended to prevent air flow from the air pressure line 122 toward the air pressure line 152. In operation, when the air compressor pump 126 is operating, the air pressure in the line 122 will cause the gate valve 156 to close thereby preventing air flow through the line 152.

Means are also provided for causing electrical connection of the air compressor pump 150 with the airplane battery 151 in the event of an undue decrease in the air pressure in the air pressure line 124 due to failure of the air compressor pump or failure of the airplane engine. This means for causing electrical connection includes an air pressure responsive switch 160 connected to the air pressure line 124. The air pressure operated switch 160 includes normally open switch contacts 161 and means for sensing a decrease in the air pressure in the air pressure line 124. The air pressure operated switch 160 also includes means for closing the switch contacts 161 in response to an undue decrease in the air pressure in air pressure line 124. The circuit also includes a manually armed switch 162 intended to be closed by the pilot once the engine is started and the pump 126 begins to operate. This switch 162 is intended to be left open when the engine is not running since the air pressure responsive switch 160 causes the circuit to be closed thereby actuating secondary pump 150 whenever the air compressor 126 is not driven. The circuit can also include a manual override switch 164 in parallel with switches 160 and 162, the manual override switch 164 being functional to actuate the secondary air compressor 150 at the election of the pilot.

Figure 4:
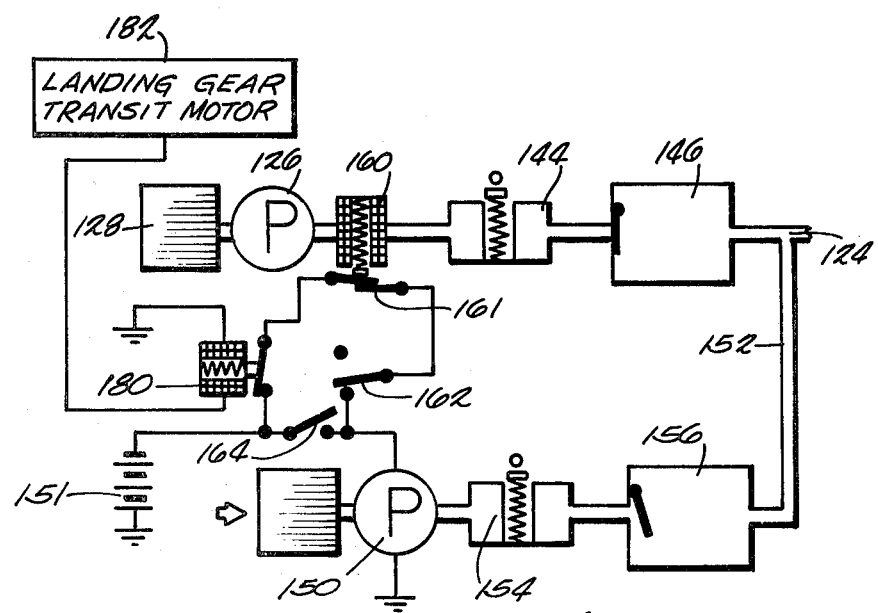
FIG. 4 is a partial view similar to FIG. 3 but showing the redundant air compressor pump operably connected to the air pressure operated instruments.

In operation of the system described above, during normal operation, the primary air compressor pump 126 is intended to create air pressure in the air pressure lines 124 and 122. The gate valve 156 prevents air flow out of the air pressure line 124 and out of air pressure line 122. Once the engine driven air compressor pump 126 is actuated and the switch contacts 161 of the air pressure responsive switch 160 are opened, the pilot then moves the manual switch 162 to the position shown in FIG. 4 thereby closing the contacts of that switch. In the event that the air compressor 126 fails, or some other occurrence causes the air pressure in the air pressure line 124 to decrease, the contacts 161 of the air pressure responsive switch 160 will close and the secondary electrically driven air compressor pump 150 will be driven by the aircraft battery. The air compressor pump 150 will then cause an air flow through the air pressure line 152 thereby opening the gate valve 156 and also causing the gate valve 146 to close as shown in FIG. 4. In the event the air pressure responsive switch 160 fails to operate, the pilot can manually actuate the redundant air compressor pump 150 by closing the manually operable switch 164.

The construction illustrated in FIGS. 3 and 4 also includes a redundant or secondary attitude indicator 170 connected to the air pressure line 122 by air pressure line 172 and to the air line 130 by a conduit 174. The manual valve 176 is provided in the line 172 and is functional to permit the pilot to alternatively and selectively connect the attitude indicator 170 to the air pressure line 122. In the event of failure of the attitude indicator 112, opening of the manual control valve 176 will activate the redundant attitude indicator 170.

The construction illustrated in FIGS. 3 and 4 also includes a switching means 180 for removing the load of the redundant air pump 150 from the aircraft's electrical circuits during those brief intervals when the landing gear transit motor 182 is in operation. This switching means 180 which prevents a possible temporary overload condition in the aircraft electrical system comprises a normally closed switch which opens only during the five to eight second operation of the landing gear transit motor 182. While the switching means 180 has been described in connection with the embodiment of the invention shown in FIGS. 3 and 4, it could also be employed in the embodiment shown in FIGS. 1 and 2.

Various features of the invention are set forth in the following claims.

I claim:

1. A redundant vacuum system for use in a vacuum operated instrument system of an aircraft, the aircraft including an engine and an electrical power source, the vacuum operated instrument system including a first vacuum pump operably connected to the aircraft engine so as to be driven by the aircraft engine, at least one vacuum operated instrument, and means for operably connecting the vacuum operated instrument to the first vacuum pump, the redundant vacuum system including a second vacuum pump, means for operably connecting the second vacuum pump to the electrical power source of the aircraft, said means for operably connecting the second vacuum pump including a vacuum responsive switch means connected to said means for operably connecting the vacuum operated instrument to the first vacuum pump and providing electrical connection between said second vacuum pump and said electrical power source in response to a decrease in vacuum in said means for operably connecting said vacuum operated vacuum instrument to the first vacuum pump, and means for operably connecting said second vacuum pump to said instrument.

2. A redundant system as set forth in claim 1 wherein the means for connecting the second vacuum pump to the instrument includes means for preventing connection of the second vacuum pump to the instrument when the first vacuum pump is operating.

3. A redundant vacuum system as set forth in claim 1 wherein the means for connecting the instrument and the first vacuum pump includes a check valve between the first vacuum pump and the instrument for preventing air flow from the first vacuum pump to the instrument and a vacuum line between the check valve and the instrument, and wherein said second vacuum pump is connected to said vacuum line between said check valve and said instrument.

4. A redundant system vacuum system as set forth in claim 1 wherein the instrument comprises an attitude indicator, and further including a second attitude indicator, means for operably connecting the second attitude indicator to the first vacuum pump, and means for selectively connecting the second attitude indicator to the second vacuum pump.

5. A redundant vacuum system as set forth in claim 1 wherein the means for providing electrical connection between the second vacuum pump and said electrical power source includes a normally open switch and means responsive to a decrease in vacuum generated by said first vacuum pump for closing said normally open switch.

6. A redundant vacuum system as set forth in claim 1 wherein the means for connecting the second pump to the electrical source further includes a manual switch having contacts intended to be closed after the first vacuum pump is operable.

7. An instrument system for an aircraft including an engine and an electrical power source, said instrument system including a first vacuum pump adapted to be operably connected to the aircraft engine so as to be driven by the aircraft engine, at least one vacuum operated instrument, means for operably connecting said vacuum operated instrument to said first vacuum pump, a second vacuum pump, means for operably connecting said second vacuum pump to the electrical power source of the aircraft and including a vacuum responsive switch means connected to said means for operably connecting the vacuum operated instrument to the first vacuum pump and said electrical power source in response to a decrease in vacuum in said means for operably connecting said vacuum operated instrument to said first vacuum, and means for operably connecting said second vacuum pump to said instrument.

8. A redundant vacuum system as set forth in claim 7 wherein the means for connecting the second vacuum pump to the instrument includes means for preventing connection of the second vacuum pump to the instrument when the first vacuum pump is operating.

9. A redundant vacuum system as set forth in claim 7 wherein the means for connecting the instrument and the first vacuum pump includes a check valve between the first vacuum pump and the instrument for preventing air flow from the first vacuum pump to the instrument and a vacuum line between the check valve and the instrument, and wherein said second vacuum pump is connected to said vacuum line between said check valve and said instrument.

10. A redundant vacuum system as set forth in claim 7 wherein the instrument comprises an attitude indicator, and further including a second attitude indicator and means for operably connecting the second attitude indicator to the first vacuum pump, and means for selectively connecting the second attitude indicator to the second vacuum pump.

11. A redundant vacuum system as set forth in claim 7 wherein the means for providing electrical connection between the second vacuum pump and said electrical power source includes a normally open switch and means responsive to a decrease in vacuum generated by said first vacuum pump for closing said normally open switch.

12. A redundant vacuum system as set forth in claim 7 wherein the means for connecting the second pump to the electrical source further includes a manual switch having contacts intended to be closed after the first vacuum pump is operable.

13. A redundant air pressure system for use in a air pressure operated instrument system of an aircraft, the aircraft including an engine and an electrical power source, the air pressure operated instrument system including a first air compressor pump operably connected to the aircraft engine so as to be driven by the aircraft engine, at least one air pressure operated instrument, and means for operably connecting the air pressure operated instrument to the first air compressor pump, the redundant air compressor system including a second air compressor pump, means for operably connecting the second air compressor pump to the electrical power source of the aircraft, said means for operably connecting the second air compressor pump including an air pressure responsive switch means connected to said means for operably connecting the air pressure operated instrument to the first air compressor pump and providing electrical connection between said second air compressor pump and said electrical power source in response to a decrease in air pressure in said means for operably connecting said air pressure operated air pressure instrument to the first air compressor pump, and means for operably connecting said second air compressor pump to said instrument.

14. A redundant air pressure system as set forth in claim 13 wherein the means for connecting the second air compressor pump to the instrument includes means for preventing connection of the second air compressor pump to the instrument when the first air compressor pump is operating.

15. A redundant air pressure system as set forth in claim 13 wherein the means for connecting the instrument and the first air compressor pump includes a check valve between the first air compressor pump and the instrument for preventing air flow from the instrument to the first air compressor pump and an air pressure line between the check valve and the instrument, and wherein said second air compressor pump is connected to said air pressure line between said check valve and said instrument.

16. A redundant air pressure system as set forth in claim 13 wherein the instrument comprises an attitude indicator, and further including a second attitude indicator and means for operably connecting the second attitude indicator to the first air compressor pump, and means for selectively connecting the second attitude indicator to the second air compressor pump.

17. A redundant air pressure system as set forth in claim 13 wherein the means for providing electrical connection between the second air compressor pump and said electrical power source includes a normally open switch and means responsive to a decrease in air pressure generated by said first air compressor pump for closing said normally open switch.

18. A redundant air pressure system as set forth in claim 13 wherein the means for connecting the second pump to the electrical source further includes a manual switch having contacts intended to be closed after the first air pressure pump is operable.

19. An instrument system for an aircraft including an engine and an electrical power source, said instrument system including a first air pressure pump adapted to be operably connected to the aircraft engine so as to be driven by the aircraft engine, at least one air pressure operated instrument, means for operably connecting said air pressure operated instrument to said first air compressor pump, a second air compressor pump, means for selectively operably connecting said second air compressor pump to the electrical power source of the aircraft and including an air pressure responsive switch means connected to said means for operably connecting the air pressure operated instrument to the first air compressor pump and said electrical power source in response to a decrease in air pressure in said means for operably connecting said air pressure operated instrument to said first air pressure, and means for selectively connecting said second air compressor pump to said instrument.

20. A redundant air pressure system as set forth in claim 18 wherein the means for connecting the second air compressor pump to the instrument includes means for preventing connection of the second air compressor pump to the instrument when the first air compressor pump is operating.

21. A redundant air pressure system as set forth in claim 18 wherein the means for connecting the instrument and the first air pressure pump includes a check valve between the first air compressor pump and the instrument for preventing air flow from the intrument to the first air compressor pump and an air pressure line between the check valve and the instrument, and wherein said second air compressor pump is connected to said air pressure line between said check valve and said instrument.

22. A redundant air pressure system as set forth in claim 18 wherein the instrument comprises an attitude indicator, and further including a second attitude indicator and means for operably connecting the second attitude indicator to the first air compressor pump, and means for selectively connecting the second attitude indicator to the second air compressor pump.

23. A redundant air pressure system as set forth in claim 18 wherein the means for providing electrical connection between the second air compressor pump and said electrical power source includes a normally open switch and means responsive to a decrease in air pressure generated by said first air compressor pump for closing said normally open switch.

24. A redundant air pressure system as set forth in claim 18 wherein the means for connecting the second pump to the electrical source further includes a manual switch having contacts intended to be closed after the first air compressor pump is operable.

* * * * *